United States Patent Office 3,218,308
Patented Nov. 16, 1965

3,218,308
METAL-CONTAINING REACTIVE PHENYLAZO-
NAPTHYLAMINOPHENYLENEAM I N O P O L Y-
HALOGENATEDPYRIMIDYL DYESTUFFS
Jürg Ammann, Basel, Switzerland, assignor to
J. R. Geigy A.-G., Basel, Switzerland
No Drawing. Filed Apr. 13, 1962, Ser. No. 187,204
Claims priority, application Switzerland, Apr. 14, 1961,
4,476/61
4 Claims. (Cl. 260—146)

The present invention concerns metal-containing, reactive dyestuffs, processes for the production thereof, their use to attain fast dyeings and the material fast dyed with the aid of these dyestuffs.

It has been found that dyeings having very good wet and light fastness properties can be attained with reactive dyestuffs of the general Formula I

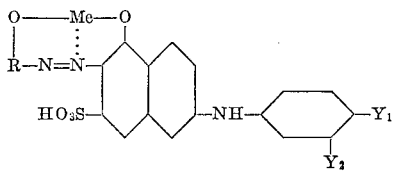

on fibres, particularly on natural or regenerated cellulose fibers, if when on the fibre, the dyestuffs are subjected to conditions which cause a chemical bond between the dyestuff and the fibre.

In the above formula:
R represents a radical of the benzene or naphthalene series containing the —O—Me— group in o-position to the azo bond and which can contain other substituents usual in azo dyestuffs, in particular 1 to at most 2 sulphonic acid groups, of $Y_1$ and $Y_2$, one Y is hydrogen, a sulphonic acid or a carboxylic acid group and the other Y is a substituted amino group containing the radical of an aromatic 1,3-diazine compound, which radical contains at least 2 halogen atoms, and Me represents a heavy metal of the atomic numbers 24 to 29 which can also be co-ordinated with other complex formers.

The principal halogen substituents of the 1,3-diazine ring are chlorine or bromine.

The radical of the diazo component termed R is preferably of the benzene or naphthalene series. In contains the —O—Me— group in o-position to the azo bond and, preferably, one to two water solubilising sulphonic acid groups. When R is of the benzene or naphthalene series, it is immaterial in what position the sulphonic acid groups are on the cyclic nucleus. The radical R, however, can also contain other substituents usual in azo components such as, for example, halogen, alkyl, alkoxy, alkylamino, acylamino, nitro, alkylsulphone, sulphamide or carboxylic acid groups. Examples of such benzene compounds forming the radical R on completion of coupling and metallisation are 2-amino-1-hydroxybenzene-4-sulphonic acid, 2-amino-4- or -6- chloro-1-hydroxybenzene-6- or -4- sulphonic acid, 2-amino-4- or -6-nitro-1-hydroxybenzene-6- or -4- sulphonic acid, 2 - amino-1-hydroxybenzene-4-methylsulphone, -2-amino-1 - hydroxybenzene - 4 - sulphamide, 2-amino-1-hydroxybenzene-4-sulphonic acid-dimethylamide, 2-amino-4- or -6- acetylamino-1-hydroxybenzene-6- or -4- sulphonic acid, 2 - amino - 6-carboxy-1-hydroxybenzene-4-sulphonic acid and 2 - amino - 1 - hydroxybenzene-4,6-disulphonic acid. However, also those benzene sulphonic acids not containing hydroxyl groups can be employed which, under the metallising conditions particularly coupling processes in the presence of oxidising agents, easily form oxygen having two separate bonds in the o-position to the azo linkage such as, e.g. 2-, 3- or 4- aminobenzene-1-sulphonic acid, 4-chloro-2-aminobenzene-1-sulphonic acid, 5-nitro-2-aminobenzene-1-sulphonic acid or 1-aminobenzene-2,4- or 2,5- disulphonic acid. In the naphthalene series, the radical R, in addition to one to three sulphonic acid groups, has the —O—Me— group in o-position to the azo bond and, possibly, also other substituents such as, e.g. halogen or nitro groups. Examples of naphthalene sulphonic acids containing hydroxyl groups which, on completion of the dyestuff formation form the radical R are 1-diazo-2-hydroxynaphthalene-4-, -5-, -6-, -7- or -8- sulphonic acid, 6-bromo- or 6-chloro- 1-diazo-2-hydroxynaphthalene-4-sulphonic acid, 6-nitro-1-diazo-2-hydroxynaphthalene - 4 - sulphonic acid and 1-diazo-2-hydroxynaphthalene-4,6-disulphonic acid. Aminonaphthalene sulphonic acids which during the metallisation, particularly the coppering, easily form oxygen having two separate linkages in the o-position to the azo bond in the presence of an oxidising agent are, for example, 1-aminonaphthalene-4-sulphonic acid, 1-aminonaphthalene-6-sulphonic acid, 2 - aminonaphthalene - 6-sulphonic acid, 2-aminonaphthalene-1, 5-disulphonic acid, 2-aminonaphthalene-4,8-disulphonic acid, 2-aminonaphthalene-5,7-disulphonic acid, 2 aminonaphthalene-6,8-disulphonic acid, 2-amino-6-nitronaphthalene-4,8-disulphonic acid, 2-aminonaphthalene-4,6,8-trisulphonic acid or 2-aminonaphthalene-1,5,7-trisulphonic acid.

In the group

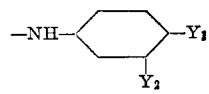

of $Y_1$ and $Y_2$, the one Y is principally hydrogen or a sulphonic acid group, but it can also be a carboxylic acid group and the other Y is an amino group containing the radical of an aromatic 1,3-diazine compound which radical also contains at least 2 halogen atoms. The amino group substituted by the diazinyl radical is preferably in the p-position to the secondary amino group as dyestuffs derived therefrom are distinguished by good drawing power onto cellulose fibres.

The 1,3-diazine radicals containing halogen and bound to the amino group which are in $Y_1$ or $Y_2$ are derived from aromatic 1,3-diazine compounds containing at least 3 halogen atoms. As such are employed 2,4-dichloro- or 2,4-dibromo- pyrimidines which in the remaining positions contain at least one other halogen atom and can also contain nitro, cyano, acyl and alkyl groups. Preferred polyhalogen-1, 3-diazines are 2,4,6-trichloropyrimidine and, in particular, 2,4,5,6-tetrachloropyrimidine.

By "Me" are meant complex-forming heavy metals of the atomic numbers 24 to 29, in particular chromium, cobalt and copper, the latter metal being preferred because of the pure shades which can be obtained therewith. The co-ordinative hexavalent metals chromium and cobalt which also contain other colored or uncolored complex formers co-ordinated to the metal e.g. a second o,o'-dihydroxy- or an o-carboxy- o'hydroxyazo dyestuff, an o-amino-o' hydroxyazo dyestuff or an o-hydroxybenzene carboxylic acid which can be further substituted, can be employed for the formation of dyestuffs according to the invention.

The dyestuffs according to the invention are obtained by two different processes:

The first, which is preferred, consists in reacting a heavy metal-containing dyestuff of the general Formula I in which R and Me have the meanings given above and of $Y_1$ and $Y_2$, one Y is hydrogen, a sulphonic acid group or a carboxylic acid group and the other Y is an acylatable amino group, with an aromatic 1,3-diazine compound containing at least 3 halogen atoms. The reaction is performed in molecular ratio of 1:1 and under such conditions that the end product still contains at least 2 halogen atoms.

The reaction conditions are so chosen that a too previous exchange of mobile substituents either by having too high pH values of the reaction medium or by having too high temperature is avoided. Thus the aqueous solutions of the alkali metal salts of metal-containing dyestuffs are reacted under the most careful temperature and pH conditions possible, i.e., depending on the stability and on the reactivity of the acylating agent, at temperatures of 0° ot about 80° C. and at pH values of about 4 to 8, preferably in the presence of agents which buffer mineral acid such as, e.g., sodium acetate, sodium carbonate, caustic soda lye, pyridine, di- or tri- sodium phosphate or also mixtures of buffer salts. The acylating agents are used in at least equimolar amount and, depending on their properties, in fine dispersion, e.g. as suspensions or emulsions, possibly with the addition of inert organic solvents which can be easily removed such as low aliphatic ketones. The acylating agents are allowed to act under the above conditions until no more free amino groups can be traced. The dyestuffs acocrding to the invention are isolated most simply by salting out in the form of their alkali metal salts from their weakly acid to at most weakly alkaline aqueous solutions. They are dried advantageously at a moderately raised temperature in vacuo.

The second process for the production of dyestuffs according to the invention consists in treating dyestuffs of the general Formula II

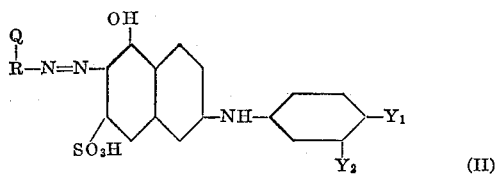

(II)

wherein

Q represents a hydroxyl group or a substituent which, under the metallising conditions can be replaced by oxygen having two separate linkages such as, e.g. the sulphonic acid group or hydrogen or a substituent which can be converted into oxygen having two separate linkages such as e.g. an acetyloxy, tosyloxy, carbalkoxy or also a low alkoxy group, any of which is in the o-position to the azo bond, and R, $Y_1$ and $Y_2$ have the meanings given in Formula I, with agents giving off heavy metal of the atomic numbers 24 to 29, the treatment being performed under such conditions that the halogen diazinyl radical is not altered and possibly the substituent Q is converted into oxygen having two separate linkages.

In the most simple case when Q is a hydroxyl group, then it is o,o'-dihydroxyazo dyestuffs which are to be metallised under neutral or, preferably, weakly acid conditions at not too high a temperature and this is done with the usual agents giving off a metal of the atomic numbers 24 to 29 such as, e.g. the mineral acid or fatty acid salts of copper, chromium or cobalt in the presence of alkali metal salts of low molecular fatty acids. However, also complex salts of co-ordinative hexavalent metals cobalt and, particularly, chromium (1:1 complexes) as described above can be employed as agents introducing metal. Mixed complexes of dyestuffs according to the invention can be produced by this method.

If Q is a substituent which, under the metallising conditions, is easily replaced by oxygen having two separate linkages, such as, e.g. the sulphonic acid group or hydrogen, then the metallisation with agents giving off copper is performed in the presence of an oxidising agent such as, e.g. hydrogen peroxide under neutral to weakly acid conditions.

Naturally the remarks above regarding reaction and isolation conditions apply here also.

The starting dyestuffs usable according to the invention for the first process are obtained by metallisation and those for the second process by acylation of dyestuffs of the general Formula II wherein Q and R have the meanings given in that formula and wherein of $Y_1$ and $Y_2$, one Y is hydrogen a sulphonic acid or carboxylic acid group and the other Y is an acylatable amino group. These latter dyestuffs are obtained by coupling, in an alkaline medium possibly in the presence of tertiary nitrogen bases such as, e.g. pyridine or γ-picoline, which accelerate the reaction, the diazonium salts of the above mentioned amines of the benzene or naphthalene series forming the radical R in the dyestuff molecule with compounds of the general Formula III

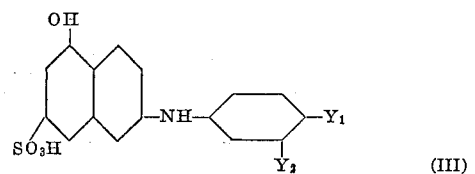

(III)

wherein of $Y_1$ and $Y_2$ one Y is hydrogen, a sulphonic acid or carboxylic acid group and the other Y is an acylatable amino group. Compounds of the Formula III are obtained for example by reacting 2-amino-5-hydroxynaphthalene-7-sulphonic acid with 1,4-diamino or 1,3-diamino benzenes or their 3- or 4- sulphonic acids or 3- or 4- carboxylic acids, i.e. with 1,4-diamino- or 1,3-diamino- benzene, 1,4-diaminobenzene-3-sulphonic acid or -3-carboxylic acid or 1,3-diaminobenzene-4-sulphonic acid or -4-carboxylic acid. The reaction is performed at a raised temperature in aqueous sodium bisulphite solution according to Bucherer.

Particularly valuable reactive dyestuffs correspond to the formula

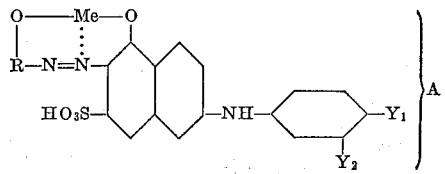

wherein

R is an at most bicyclic carbocyclic aryl radical, the —Me— being attached to an O which is bound to R in a position vicinal to the azo group, One of $Y_1$ and $Y_2$ is preferably hydrogen or —$SO_3H$, but can also be —COOH, and the other $Y_1$ and $Y_2$ is a polyhalogenpyrimidyl-(4)-amino group, by which there is meant the polyhalogenpyrimidyl-NH.group, the halogen having atomic weight of 35 to 80, i.e. chlorine or bromine.

Me is preferably —Cu— but can also be

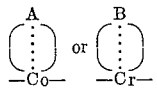

wherein

B is the radical of an ortho-ortho'-dihydroxy monoazo dyestuff, particularly of a naphthol-azo-naphthol, a phenol-azo-naphthol radical or a phenol-azo-phenol radical.

The radical R is a preferably monosulphonated phenyl radical, disulphonated phenyl radical, monosulphonated naphthyl radical or disulphonated naphthyl radical, i.e. a phenyl or naphthyl radical containing one or two —$SO_3H$ groups. However R can for example be a monosulphonated phenyl radical which can be substituted by chlorine, acetylamino or nitro, a monosulphonated naphthyl radical which can be substituted by nitro, bromine or chlorine or a phenyl radical substituted by the sulphamide or methylsulphonyl group.

The polyhalogen-pyrimidyl reactive radical is a dihalogen pyrimidyl radical, e.g. the 2,6-dichloro- or 2,6-dibromo-pyrimidyl-(4)-radical which can contain a substituent in the remaining position, e.g. lower alkyl (1-2 carbon) acetyl and in particular a further chlorine or bromine, e.g. the 2,5,6-trichloro- or 2,5,6-tribromopyrimidyl-(4)-radical, the 2,6-dichloro-5-bromo-pyrimidyl-(4)-radical, the 2,6-dichloro-5-methyl-pyrimidyl-(4)-radical, the 2,6-dichloro-5-ethyl-pyrimidyl-(4)-radical or the 2,6-dichloro-5-acetyl-pyrimidyl-(4)-radical.

In the polyhalogen-pyrimidyl reactive radical chlorine is the preferred halogen. However bromine can be employed in addition or as a substitute for the chlorine atom. Dyestuffs which contain the dichloropyrimidyl group and especially those which contain the trichloropyrimidyl group in combination with R when it is the mono- or disulphonated phenyl radical are particularly advantageous.

The azo dyestuffs obtained according to the invention are dark powders and, in the form of their alkali metal salts, are particularly easily soluble in water. This good water solubility is to be ensured by the choice of starting components, i.e. by seeing that at least 1, preferably however, several sulphonic acid groups are present per dyestuff molecule. The dyestuffs are suitable for the dyeing and printing of wool, silk, leather and synthetic polyamide fibres, particularly those of natural or regenerated cellulose, in red-violet, blue-violet, navy blue to black shades. The cellulose material is impregnated or printed advantageously at a low temperature, e.g. at 20–50° C. with the possibly thickened dyestuff solution and is then fixed by a treatment with acid binding agents. As such can be employed, e.g. sodium carbonate, potassium carbonate, di- and tri- sodium phosphate, sodium metasilicate, caustic soda lye and, at temperatures of over 50° C., also potassium or sodium bicarbonate.

The treatment with these agents can be performed even at room temperature or at a slightly raised temperature, preferably in the presence of a strong alkali such as, e.g. caustic soda lye or trisodium phosphate. The azo dyestuffs according to the invention however, can also be advantageously fixed after a mild intermediate drying of the impregnated or printed goods at a raised temperature, e.g. 70–160° C. Instead of an alkaline after-treatment, particularly when the dyestuffs are fixed hot, the acid binding agents can also be added to the impregnating liquors or printing pastes and then the dyeing is developed by a short heating at temperatures of over 100–160°. In this process, the addition of hydrotropic agents to the printing colours and impregnating liquors is advantageous, e.g. the addition of urea in amounts of 10 to 200 g. per litre of colouring agent. This treatment with acid binding agents causes the new dyestuffs to be chemically bound to the fibre and, after soaping to remove non-fixed dyestuff, the cellulose dyeings obtained therewith have excellent wet fastness, very good fastness to light and are considerably insensitive to processing with synthetic resins.

An advantage in technical application of the dyestuffs according to the invention, in particular those in which the coupling component is derived from the condensation product of 2-amino-5-hydroxynaphthalene-7-sulphonic acid and 1,4-diaminobenzene compounds, is an increased affinity to cellulose. They are, therefore, particularly suitable for the dyeing of cellulose fibres from liquors having a greater ratio than usual, above all in the presence of salts which accelerate the drawing of the dyestuffs such as sodium sulphate or sodium chloride. Surprisingly, in spite of this increased substantivity, non-fixed dyestuff can be easily and completely washed out which is one of the most important requirements for the good wet fastness of cellulose dyeings produced with reactive dyestuffs. In addition, the dyestuffs according to the invention are distinguished by the high stability of the dye baths and printing pastes.

The following examples serve to further illustrate the invention. The temperatures are given therein in degrees centigrade. Where not otherwise expressly stated, parts are given as parts by weight and their relationship to parts by volume is as that grammes to cubic centimetres.

EXAMPLE 1

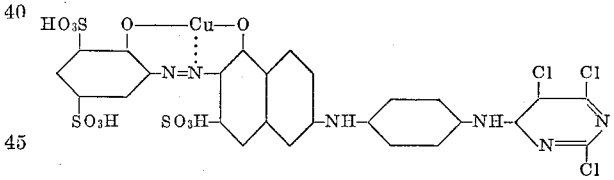

26.9 parts of 2-amino-1-hydroxybenzene-4,6-disulphonic acid are diazotised in the usual way with 6.9 parts of sodium nitrite and 25 parts of 30% hydrochloric acid. The aqueous diazonium solution is poured at 0–10° into a solution of 33.0 parts of 2-(4'-aminophenylamino)-5-hydroxynaphthalene-7-sulphonic acid and 30 parts of sodium carbonate in 400 parts of water. As soon as the coupling is complete, the pH is adjusted to 4.5–5.0 with dilute acetic acid; then, first 27.2 parts of crystallised sodium acetate and then a solution of 25 parts of crystallised copper sulphate in 100 parts of water are added and the whole is stirred for 30 minutes at 60–65°. The coppered dyestuff is precipitated with sodium chloride, filtered off and washed with dilute sodium chloride solution. The moist filter cake is dissolved in 800 parts of water at 60–65° and 24.0 parts of 2,4,5,6-tetrachloropyrimidine are added. The pH of the reaction mixture is kept at 6.0–6.5 by the simultaneous addition dropwise of sodium carbonate solution. As soon as no more diazotisable amino groups can be traced, the new dyestuff is salted out, filtered off, washed and dried in vacuo at 50–60°. The copper-containing reactive dyestuff is a dark powder which dissolves in water with a violet colour.

The same dyestuff is obtained if the amino monoazo dyestuff not containing heavy metal is condensed under the same conditions first with 2,4,5,6-tetrachloropyrimidine and then treated with an agent giving off copper.

2 parts of the new dyestuff are dissolved in 1000 parts of water and 40 parts of sodium carbonate are added to the solution. 100 parts of cotton are introduced at 40°, the bath is heated within 30 minutes to 90–95, 80 parts of sodium chloride are added and dyeing is performed for 1 hour at this temperature. The goods are then rinsed and soaped at the boil for 30 minutes. A pure, violet dyeing is obtained which has excellent wet and light fastness properties.

Dyestuffs having similar properties are obtained if, instead of the 24.0 parts of 2,4,5,6-tetrachloropyrimidine, equivalent amounts of 2,4,6-trichloro-5-bromopyrimidine, 2,4,6 - trichloro - pyrimidine or 2,4,6 - tribromopyridine are used.

Similar dyestuffs are also obtained if equimolecular amounts of the copper-containing amino monoazo dyestuffs given in the following Table 1 are reacted with the acylating agents given in column 3 of the same table by the process described above.

Table 1

| No. | Copper complex of the aminomonoazo dyestuff | Acylating agent | Shade of cellulose dyeing |
|---|---|---|---|
| 1 | 2-amino-1-hydroxybenzene-4-sulphonic acid→2-(4'-aminophenylamino)-5-hydroxynaphthalene-3',7-disulphonic acid. | 2,4,5,6-tetrachloropyrimidine. | Violet. |
| 2 | do | 2,4,6-trichloropyrimidine. | Do. |
| 3 | do | 2,4,5,6-tetrabromopyrimidine. | Do. |
| 4 | do | 5-methyl-2,4,6-trichloropyrimidine. | Do. |
| 5 | do | 5-acetyl-2,4,6-trichloropyrimidine. | Do. |
| 6 | 2-amino-1-hydroxybenzene-4,6-disulphonic acid→2-(4'-aminophenylamino)-5-hydroxynaphthalene-3'-carboxylic acid-7-sulphonic acid. | 2,4,5,6-tetrachloropyrimidine. | Do. |
| 7 | do | 5-bromo-2,4,6-trichloropyrimidine. | Do. |
| 8 | 2-amino-1-hydroxybenzene-4,6-disulphonic acid→2-(3'-aminophenylamino)-5-hydroxynaphthalene-7-sulphonic acid. | 2,4,5,6-tetrachloropyrimidine. | Reddish-violet. |
| 9 | do | 2,4,6-trichloropyrimidine. | Do. |
| 10 | 2-amino-1-hydroxybenzene-4-sulphonic acid→2-(3'-aminophenylamino)-5-hydroxynaphthalene-4',7-disulphonic acid. | 2,4,5,6-tetrachloropyrimidine. | Do. |
| 11 | do | 2,4,6-trichloropyrimidine. | Do. |
| 12 | do | 5-ethyl-2,4,6-trichloropyrimidine. | Do. |
| 13 | 2-amino-1-hydrozybenzene 4-sulphonic acid→2-(3'-aminophenylamino)-5-hydroxynaphthalene-4'-carboxylic acid-7-sulphonic acid. | 2,4,5,6-tetrabromopyrimidine. | Do. |
| 14 | do | 2,4,5,6-tetrachloropyrimidine. | Do. |
| 15 | 2-amino-1-hydroxybenzene-4-sulphonic acid→2-(4'-N-methylaminophenylamino)-5-hydroxynaphthalene-3',7-disulphonic acid. | do | Do. |
| 16 | do | 5-acetyl-2,4,6-trichloropyrimidine. | Do. |
| 17 | 2-amino-1-methoxybenzene-4,6-disulphonic acid→2-(3'-aminophenylamino)-5-hydroxynaphthalene-4',7-disulphonic acid. | 5-methyl-2,4,6-trichloropyrimidine. | Do. |
| 18 | 2-amino-6-acetylamino-1-hydroxybenzene-4-sulphonic acid→2-(3'-aminophenylamino)-5-hydroxynapthtalene-4'-carboxylic acid-7-sulphonic acid. | 2,4,5,6-tetrachloropyrimidine. | Do. |
| 19 | 2-amino-6-nitro-1-hydroxybenzene-4-sulphonic acid→2-(4'-aminophenylamino)-5-hydroxynaphthalene-3',7-disulphonic acid. | 2,4,5,6-tetrachloropyrimidine. | Blue-violet. |
| 20 | 2-amino-1-hydroxybenzene-4-methylsulphone→2-(4'-aminophenylamino)-5-hydroxynaphthalene-3',7-disulphonic acid. | do | Violet. |
| 21 | 2-amino-1-hydroxybenzene-4-sulphamide→2-(4'-aminophenylamino)-5-hydroxynaphthalene-3'-carboxylic acid-7-sulphonic acid. | do | Do. |
| 22 | 6-chloro-2-amino-1-hydroxybenzene-4-sulfonic acid→2-(4'-aminophenylamino)-5-hydroxynaphthalene-3',7-disulphonic acid. | 2,4,5,6-tetrachloropyrimidine. | Reddish-violet. |
| 23 | do | 5-acetyl-2,4,6-trichloropyrimidine. | |

EXAMPLE 2

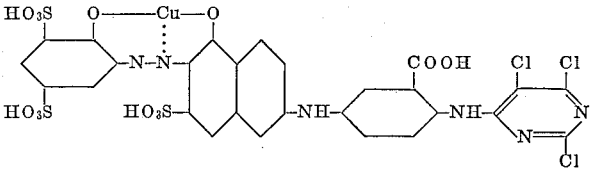

The diazoninum salt solution, produced by diazotising 26.9 parts of 2-amino-1-hydroxybenzene-4,6-disulphonic acid with 6.9 parts of sodium nitrite in the presence of hydrochloric acid, is coupled at 0–10° with the solution of 37.5 parts of 2-(4'-aminophenylamino)-5-hydroxynaphthalene-3'-carboxylic acid-7-sulphonic acid and 30 parts of sodium carbonate in 500 parts of water. On completion of the coupling, the dyestuff solution is adjusted to pH 6.0–6.5 with dilute hydrochloric acid whereupon it is heated to 60–65°, 24.0 parts of 2,4,5,6-tetrachloropyrimidine are added and the whole is stirred until no more diazotisable amino groups can be traced, the pH being kept at 6.0–6.5 by the simultaneous addition dropwise of sodium carbonate solution. The condensed dyestuff is precipitated with sodium chloride, filtered off and dissolved in 800 parts of water at 40–45°. After the addition of 27.2 parts of crystallised sodium acetate, a solution of 25 parts of crystallised copper sulphate in 100 parts of water is added dropwise within 10 minutes. The coppered dyestuff is salted out, filtered off, washed with dilute sodium chloride solution and dried in vacuo at 50–60°. It is a dark powder which dissolves in water with a violet colour.

The dyestuff is identical with that produced according to Table 1, No. 6.

If cotton is impregnated at 20° with a 2% solution of this dyestuff, which solution also contains 5% of urea and 2% of sodium carbonate, then steamed for 5 to 10 minutes at 100–110°, rinsed and soaped at the boil, then a violet dyeing is obtained which has good light fastness and very good wet fastness properties.

EXAMPLE 3

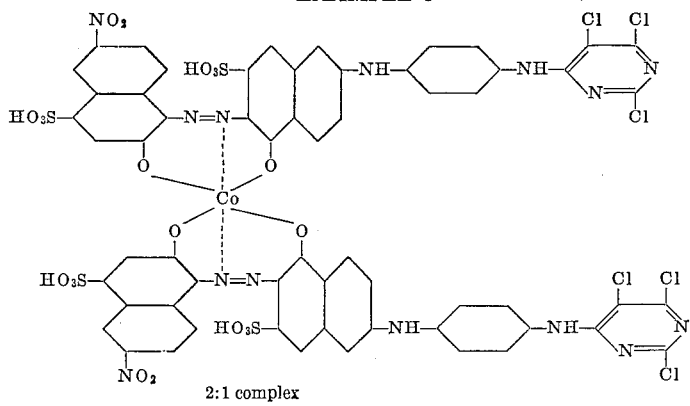

2:1 complex 66.4 parts of the 2:1 cobalt complex of the amino monoazo dyestuff, obtained by coupling 6-nitro-1-diazo-2-hydroxynaphthalene-4-sulphonic acid in an alkaline medium with 2-(4'-aminophenylamino)-5-hydroxynaphthalene-7-sulphonic acid and treating the dyestuff with cobalt acetate at 70–80° in a neutral to weakly acid medium, are dissolved in 800 parts of water with a neutral reaction. 24.0 parts of 2,4,5,6-tetrachloropyrimidine are added to this solution at 60 to 65° and the pH of the reaction mixture is maintained at 6.0–6.5 by the simultaneous addition dropwise of dilute sodium carbonate solution, until no more diazotisable amino groups can be traced. The new dystuff is precipitated with sodium chloride, filtered off, washed and dried in vacuo at 50–60°. It is dark powder which dissolves in water with a black colour.

If cotton is impregnated with a 4% solution of the above dyestuff, which solution also contains 20% of urea and 2% of sodium carbonate, the goods, after a mild intermediate drying, are heated for 4 minutes at 140–160°, then rinsed and soaped at the boil, then a grey black dyeing having good wet and light fastness is obtained.

Similar dyestuffs are obtained on reacting the 2:1 cobalt complexes of the aminomonoazo dyestuffs given in Table 3 with the acylating agents given in column 3 of the same table under the conditions described in the above example.

EXAMPLE 4

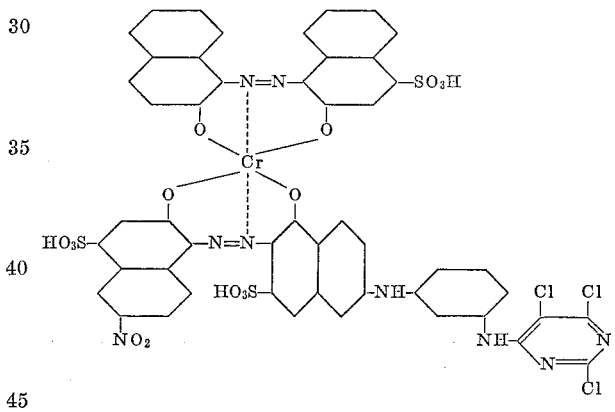

63.6 parts of the aminomonoazo dyestuff 6-nitro-1-diazo-2-hydroxynaphthalene-4-sulphonic acid →2-(3'-aminophenylamino)-5-hydroxynaphthalene-7-sulphonic acid are dissolved in 500 parts of water, the pH being adjusted to 10–11 with caustic soda lye. 44.0 parts of the 1:1 chromium complex of the monoazo dyestuff 1-diazo-2-hydroxynaphthalene-4-sulphonic acid →2-hydroxynaphthalene are then added and the mixture is heated for 1 hour at 80–85°. At the end of this time the mixture is cooled to 60–65°, and pH is adjusted to 6.0–6.5 with acetic acid and 24.0 parts of 2,4,5,6-tetrachloropyrimidine are added. The pH of the reaction mixture is kept at 6.0–6.5 by the simultaneous addition dropwise of dilute caustic soda lye. On completion of the reaction, the new dyestuff is precipitated by the addition of sodium chloride, filtered off and dried in vacuo at 50–60°. It is a dark powder which dissolves in water with a blue-black colour.

If cotton is pad dyed with a solution which contains 40 parts of the above dyestuff, 200 parts of urea and 20 parts of sodium carbonate in 1000 parts of water, dried at 40°, subjected to a dry treatment for 4 minutes at 140°, then rinsed and soaped at the boil for 30 minutes, then a blueish grey dyeing is obtained which has good wet and light fastness properties.

Similar dyestuffs are obtained if the o,o'-dihydroxyazo dyestuffs given in column 2 of the following Table 4 are reacted with the 1:1 chromium complexes of the monoazo dyestuffs given in column 3 of the same table and the 2:1 mixed complexes so obtained are condensed with the acylating agents given in column 4.

*Table 3*

| No. | 2:1 cobalt complex of aminomonoazo dyestuff | Acylating agent | Shade of cellulose dyeing |
|---|---|---|---|
| 1 | 6-nitro-1-diazo-2-hydroxynaphthalene-4-sulphonic acid→2-(4'-aminophenylamino)-5-hydroxynaphthalene-7-sulphonic acid. | 2,4,6-trichloropyrimidine. | Grey-black. |
| 2 | ---do--- | 2,4,5,6-tetrabromopyrimidine. | Do. |
| 3 | ---do--- | 5-methyl-2,4,6-trichloropyrimidine. | Do. |
| 4 | 6-nitro-1-diazo-2-hydroxynaphthalene-4-sulphonic acid→2-(4'-aminophenylamino)-5-hydroxynaphthalene-3',7-disulphonic acid. | 2,4,5,6-tetrachloropyrimidine. | Do. |
| 5 | 1-diazo-hydroxynaphthalene-4-sulphonic acid→2-(3'-aminophenylamino)-5-hydroxynaphthalene-7-sulphonic acid. | ---do--- | Violet black. |
| 6 | 2-amino-6-nitro-1-hydroxbenzene-4-sulphonic acid→2-(3'-aminophenylamino)-5-hydroxynaphthalene-4'-carboxylic acid-7-sulphonic acid. | ---do--- | Do. |
| 7 | ---do--- | 5-acetyl-2,4,6-trichloropyrimidine. | Do. |
| 8 | 2-amino-1-hydroxybenzene-4-methylsulphone→2,(4'-aminophenylamino)-5-hydroxynaphthalene-3',7-disulphonic acid. | 2,4,5,6-tetrachloropyrimidine. | Do. |
| 9 | 2-amino-1-hydroxybenzene-4-sulphamide→2(3',aminophenylamino)-5-hydroxynaphthalene-7-sulphonic acid. | ---do--- | Do. |
| 10 | 6-chloro-1-diazo-2-hydroxynaphthalene-4-sulphonic acid→2-(4'-aminophenylamino)-5-hydroxynaphthalin-7-sulphonic acid. | ---do--- | Do. |

Table 4

| No. | o,o'-dihydroxyazo dyestuff | 1:1 Cr complex of monoazo dyestuff | Acylating agent | Shade of cellulose dyeing |
|---|---|---|---|---|
| 1 | 6-nitro-1-diazo-2-hydroxynaphthalene 4-sulphonic acid → 2-(4'-aminophenylamino)-5-hydroxy-naphthalene-7-sulphonic acid. | 1-diazo-2-hydroxynaphthalene-4-sulphonic acid → 2-hydroxynaphthalene. | 2,4,5,6-tetrachloropyrimidine. | Blueish grey-black. |
| 2 | 6-nitro-1-diazo-2-hydroxynaphthalene-4-sulphonic acid → 2-(4'-aminophenylamino)-5-hydroxynaphthalene-3',7-disulphonic acid. | ....do.... | ....do.... | Do. |
| 3 | 1-diazo-2-hydroxynaphthalene-4-sulphonic acid → 2-(4'-aminophenylamino)-5-hydroxynaphthalene-7-sulphonic acid. | 4-nitro-2-amino-1-hydroxybenzene → 2-hydroxynaphthalene. | 5-bromo-2,4,6-trichloropyrimidine. | Do. |
| 4 | ....do.... | ....do.... | 2,4,5,6-tetrachloropyrimidine. | Do. |
| 5 | 6-nitro-2-amino-1-hydroxybenzene-4-sulphonic acid → 2-(4'-aminophenylamino)-5-hydroxynaphthalene-3'-carboxylic acid-7-sulphonic acid. | 4-nitro-2-amino-1-hydroxybenzene → 4-amyl-1-hydroxybenzene. | 2,4,6-trichloropyrimidine. | Do. |
| 6 | 4-nitro-2-amino-1-hydroxybenzene → 2-(4'-aminophenylamino)-5-hydroxynaphthalene-3',7-disulphonic acid. | 1-diazo-2-hydroxynpahthalene-4-sulphonic acid → 2-hydroxynaphthalene. | 2,4,5,6-tetrachloropyrimidine. | Grey-violet. |
| 7 | 6-bromo-1-diazo-2-hydroxynaphthalene-4-sulphonic acid → 2-(4'-aminophenylamino)-5-hydroxynaphthalene-7-sulphonic acid. | ....do.... | ....do.... | Do. |
| 8 | 6-chloro-1-diazo-2-hydroxynaphthalene-4-sulphonic acid → 2-(4'-aminophenylamino)-5-hydroxynaphthalene-3'-carboxylic acid-7-sulphonic acid. | 5-nitro-2-amino-1-hydroxybenzene → 2-hydroxynaphthalene. | 5-acetyl-2,4,6-trichloropyrimidine. | Do. |
| 9 | 6-nitro-2-amino-1-hydroxybenzene-4-sulphonic acid → 2-(4'-aminophenylamino)-5-hydroxynaphthalene-7-sulphonic acid. | 4-nitro-2-amino-1-hydroxybenzene → 4-amyl-1-hydroxybenzene. | 2,4,5,6,-tetrachloropyrimidine. | Do. |

EXAMPLE 5

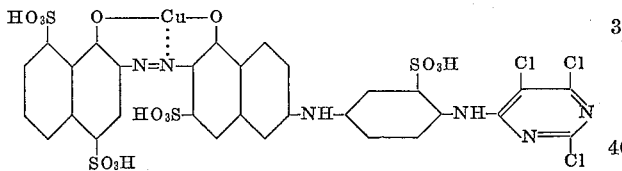

30.3 parts of 2-aminonaphthalene-4,8-disulphonic acid are diazotised with 6.9 parts of sodium nitrite in the presence of hydrochloric acid and then coupled with the solution of 41.0 parts of 2-(4'-aminophenylamino)-5-hydroxynaphthalene-3',7-disulphonic acid and 30 parts of sodium carbonate in 400 parts of water at 0–10°. On completion of the coupling, the red dyestuff solution is heated to 60–65°, the pH is adjusted to 6.5–7.0 with acetic acid and 24.0 parts of 2,4,5,6-tetrachloropyrimidine are stirred in. The hydrochloric acid liberated is continuously neutralized by the simultaneous addition dropwise of dilute sodium carbonate solution. On completion of the reaction, the dyestuff is salted out, filtered off and washed with dilute sodium chloride solution. The moist filter cake is dissolved in 1000 parts of water at a pH of 5.0 and 50 parts of crystallised sodium acetate and 28 parts of crystallised copper sulphate in 100 parts of water are added to the solution. 180 parts of hydrogen peroxide 5% are then added dropwise within 1 hour at 20–25° and the stirring is continued for 2 hours at room temperature. The uncoppered dyestuff has disappeared at the end of this time and the new copper-containing dyestuff is precipitated with sodium chloride, filtered off and washed. It is a dark powder which dissolves in water with a blue-black colour.

2 parts of the new dyestuff are dissolved in 1000 parts of water and 40 parts of sodium carbonate are added to the solution. 100 parts of cotton are introduced at 40°, the bath is heated within 30 minutes to 90–95°, 80 parts of calcined sodium sulphate are added and dyeing is performed for 1 hour at this temperature. The goods are then rinsed and soaped at the boil for 30 minutes. A blue-black dyeing which has very good wet and light fastness properties is obtained.

Dyestuffs having similar properties are obtained if the aminomonoazo dyestuffs given in the following Table 5 are condensed with the acylating agents given in the same table and then treated by the method described above with hydrogen peroxide and agents giving off copper.

Table 5

| No. | Aminomonoazo dyestuffs | Acylating agents | Shade of cellulose dyeing |
|---|---|---|---|
| 1 | 2-aminonaphthalene-4,8-disulphonic acid→2-(4'-aminophenylamino)-5-hydroxynaphthalene-7-sulphonic acid. | 2,4,6-trichloropyrimidine. | Blue-black |
| 2 | 2-aminonaphthalene-1,5-disulphonic acid→2-(4'-aminophenylamino)-5-hydroxynaphthalene-3',7-disulfonic acid. | ....do.... | Do. |
| 3 | 2-aminonaphthalene-6,8-disulphonic acid→2-(3'-aminophenylamino)-5-hydroxynaphthalene-7-sulphonic acid. | 5-acetyl-2,4,6-trichloropyrimidine. | Violet-black. |
| 4 | 1-aminonaphthalene-4-sulphonic acid→2-(3'-aminophenylamino)-5-hydroxynaphthalane-4',7-sulphonic acid. | 2,4,5,6-tetrachloropyrimidine. | Blue-violet |
| 5 | 2-aminonaphthalene-6-sulphonic acid→2-(4'-aminophenylamino)-5-hydroxynaphthalene-3'-carboxylic acid-7-sulphonic acid. | ....do.... | Do. |
| 6 | 1-aminobenzene-4-sulphonic acid→2-(4'-aminophenylamino)-5-hydroxynaphthalene-3',7-disulphonic acid. | ....do.... | Violet. |
| 7 | 2-aminonaphthalene-5,7-disulphonic acid→2-(3'-aminophenylamino)-5-hydroxynaphthalene 4',7-disulphonic acid. | ....do.... | Blue-violet. |
| 8 | 2-aminonaphthalene-4,6,8-trisulphonic acid→2-(4'-aminophenylamino)-5-hydroxynaphthalene-7-sulphonic acid. | 2,4,6-trichloropyrimidine. | Do. |
| 9 | 1-aminobenzene-2,5-disulphonic acid→2-(3'-aminophenylamino)-5-hydroxynaphthalene-7-sulphonic acid. | 2,4,5,6-tetrachloropyrimidine. | Do. |

EXAMPLE 6

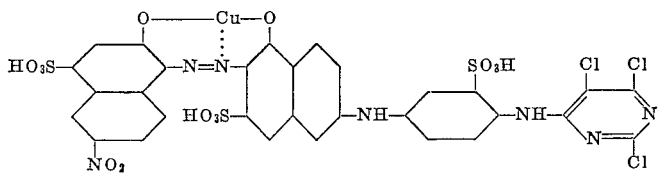

77.8 parts of the copper complex of the aminomonoazo dyestuff, obtained by coupling 6-nitro-1-diazo-2-hydroxy-naphthalene-4-sulphonic acid in an alkaline medium with 2 - (4'-aminophenylamino) - 5 - hydroxynaphthalene - 3',7-disulphonic acid and treating the resultant dyestuff with an agent giving off copper, are dissolved with a neutral reaction in 1000 parts of water. The dyestuff solution, heated to 60–65°, is condensed at a pH of 6.0–6.5 with 24.0 parts of 2,4,5,6 - tetrachloropyrimidine. On completion of the reaction, the new dyestuff of the above formula is salted out, filtered off and dried at a raised temperature in vacuo. The ground dyestuff is a dark powder which dissolves in water with a blue-violet colour.

2 parts of the new dyestuff are dissolved in 1000 parts of water and 25 parts of trisodium phosphate and 60 parts of sodium chloride are added to the solution. 100 parts of cotton are introduced at 50°, the bath is heated to 90–95° within 60 minutes and dyeing is performed for 1 hour at this temperature. After rinsing and soaping, a blue-violet dyeing is obtained which has good wet and light fastness properties.

Dyestuffs having similarly good properties are obtained be reacting the copper-containing aminomonoazo dyestuffs given in Table 6 with at least an equimolecular amount of the acylating agents given in column 3 of the same table under the conditions described in the above example.

Table 6

| No. | Copper complex of the aminomonoazo dyestuff | Acylating agent | Shade of cellulose dyeing |
|---|---|---|---|
| 1 | 6-nitro-1-diazo-2-hydroxy-naphthalene-4-sulphonic acid→2-(4'-aminophenyl-amino)-5-hydroxynaphthalene-7-sulphonic acid. | 2,4,5,6,-tetachloro-pyrimidine. | Blue-violet. |
| 2 | 6-nitro-1-diazo-2-hydroxy-naphthalene-4-sulphonic acid→2-(3'-aminophenyl-amino)-5-hydroxynaphthalene-4'-carboxylic acid-7-sulphonic acid. | 2,4,6-trichloro-pyrimidine. | Do. |
| 3 | 6-bromo-1-diazo-2-hydroxy-naphthalene-4-sulphonic acid→2-(3-'_aminophenyl-amino)-5-hydroxynaphthal-ene 4',7-disulphonic acid. | 5-acetyl-2,4,6-tri-chloropyrimi-dine. | Do. |
| 4 | ----do---- | 2,4,6-trichloro-pyrimidine. | Do. |
| 5 | 1-diazo-2-hydroxynaphthalene 4-sulphonic acid→2-(4'-aminophenylamino)-5-hydroxynaphthalene-7-sulphonic acid. | 2,4,5,6-tetrachloro-pyrimidine. | Blue-violet. |
| 6 | ----do---- | 5-bromo-2,4,6-tri-chloropyrimi-dine. | Do. |
| 7 | 6-chloro-1-diazo-2-hydroxy-naphthalene-4-sulphonic acid→2-(3'-aminophenyl-amino)-5-hydroxynaphtha-lene-7-sulphonic acid. | 2,4,5,6-tetra-chloropyrimi-dine. | Do. |

What is claimed is:

1. The metal-containing reactive dyestuff of the formula

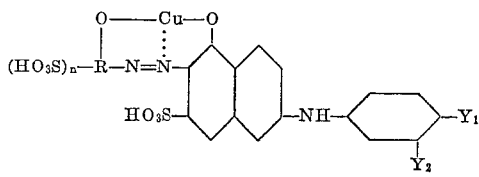

wherein

R is a member selected from the group consisting of phenyl, halogenophenyl, lower alkylphenyl, lower alkoxyphenyl, lower alkylaminophenyl, acetylaminophenyl, nitrophenyl, lower alkylsulfonylphenyl, sulfamylphenyl, carboxyphenyl, naphthyl, bromonaphthyl, chloronaphthyl and nitronaphthyl, the group —Cu— being attached to an O which is bound to R is a position vicinal to the azo group one of $Y_1$ and $Y_2$ is a member selected from the group consisting of H, —$SO_3H$ and —COOH and the other of $Y_1$ and $Y_2$ is a member selected from the group consisting of dihalogen-pyrimidyl-(4)-amino, trihalogen - pyrimidyl - (4) - amino, acetyl - dihalogen - pyrimidyl - (4) - amino, and lower alkyl - dihalogen - pyrimidyl - (4) - amion, the halogen having atomic weight of 35 to 80, and $n$ is a whole number from 1 to 3 inclusive.

2. The metal-containing reactive dyestuff of the formula

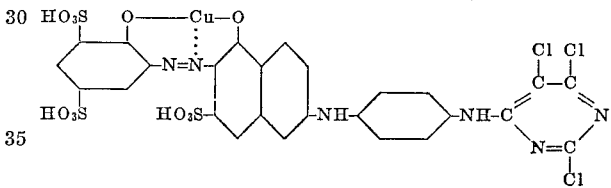

3. The metal-containing reactive dyestuff of the formula

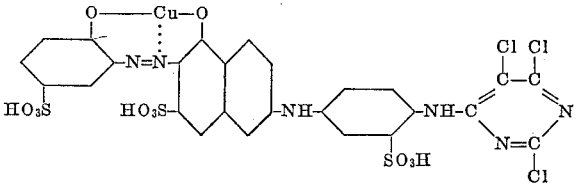

4. The metal-containing reactive dyestuff of the formula

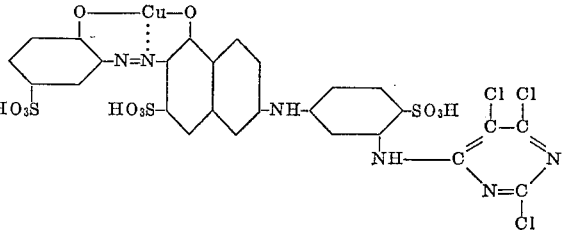

References Cited by the Examiner

UNITED STATES PATENTS

| | | | |
|---|---|---|---|
| 1,886,480 | 11/1932 | Haller et al. | 260—153 |
| 3,041,328 | 6/1962 | Kraus et al. | 260—146 |
| 3,134,761 | 5/1964 | Ackermann et al. | 260—146 |

FOREIGN PATENTS

| | | |
|---|---|---|
| 214,546 | 4/1961 | Austria. |
| 571,945 | 4/1959 | Belgium. |
| 1,221,621 | 1/1960 | France. |
| 1,225,281 | 2/1960 | France. |

CHARLES B. PARKER, *Primary Examiner.*

LEON ZITVER, *Examiner.*